United States Patent [19]

Stone

[11] Patent Number: 4,598,220
[45] Date of Patent: Jul. 1, 1986

[54] END PLAY AND LUBRICATING SYSTEM FOR FRACTIONAL HORSEPOWER ELECTRIC MOTORS

[75] Inventor: Thomas W. Stone, Owosso, Mich.

[73] Assignee: Universal Electric Company, Owosso, Mich.

[21] Appl. No.: 640,979

[22] Filed: Aug. 15, 1984

[51] Int. Cl.⁴ ............................................. H02K 5/16
[52] U.S. Cl. .................................... 310/90; 384/213; 384/220; 411/513
[58] Field of Search .............. 310/90, 91, 89, 40 MM; 384/218, 220, 297, 298, 299, 402, 408, 204, 213; 411/531, 542

[56] References Cited

U.S. PATENT DOCUMENTS

| 2,668,086 | 2/1954 | Marzolf | 310/90 U X |
| 2,769,934 | 11/1956 | Stone | 310/90 M X |
| 3,441,235 | 4/1969 | Sjotun | 310/90 |
| 3,567,973 | 3/1971 | Mastrodonato | 310/42 |
| 3,728,563 | 4/1973 | Stone | 310/91 |
| 3,789,251 | 1/1974 | King | 310/90 |
| 3,816,782 | 6/1974 | Dow | 310/90 |
| 3,846,652 | 11/1974 | Lykes | 310/90 |
| 4,319,150 | 3/1982 | Roddy | 310/91 |
| 4,326,757 | 4/1982 | Ozaki | 310/90 |
| 4,355,250 | 10/1982 | Langdon | 310/90 |
| 4,494,027 | 1/1985 | Otto | 310/90 |

FOREIGN PATENT DOCUMENTS 0284534  5/1967  Australia .............................. 310/90

Primary Examiner—R. Skudy
Attorney, Agent, or Firm—Barnes, Kisselle, Raisch, Choate, Whittemore & Hulbert

[57] ABSTRACT

A fractional horsepower electric motor comprises a stator, a shell supporting the stator, end members closing the ends of the shell, a shaft supporting a rotor within the stator, a bearing system on the end members rotatably supporting the shaft comprising a bearing member on the shaft engaging a seat on the end member, a spring yieldingly urging the bearing member against the seat, an oil retention body associated with the bearing member, a spacer on the shaft, and a composite washer interposed between said spacer and said bearing member through which said shaft extends. The composite washer comprises a base layer of plastic filament material, a layer of resilient elastic material bonded to one surface of the base layer, and an oil impregnated layer bonded to the other surface of the base layer and engaging said bearing member, whereby oil from the bearing passes through the base layer in capillary fashion and upon rotation is directed in small droplets toward said oil reservoir.

7 Claims, 3 Drawing Figures

END PLAY AND LUBRICATING SYSTEM FOR FRACTIONAL HORSEPOWER ELECTRIC MOTORS

This invention relates to fractional horsepower electric motors and particularly to lubricating and end play systems for fractional horsepower electric motors.

BACKGROUND AND SUMMARY OF THE INVENTION

Fractional horsepower electric motors conventionally comprise a shell that supports a stator, end members closing the ends of the shell and bearings on the end members rotatably supporting a shaft on which a rotor is mounted. The bearings usually comprise a bearing member on the shaft which engages a seat on the end member and is yieldingly urged against the seat and an oil retainer in the form of a felt washer adjacent the bearing. In order to control end play and provide lubrication, it is conventional to provide an oil impregnated washer adjacent the bearing member, a felt washer adjacent the oil impregnated washer and an oil throw washer or slinger adjacent the felt washer which directs oil to an oil storage felt on the end member.

Such a system is intended to provide the following functions:

(1) A means of transferring oil that travels over the washer system back into the felt pack. This function is called the oil slinger and is usually accompanied by an oil slinger washer.

(2) Block the path of oil traveling down the shaft under the washers and to provide some sort of a suitable seal. A traditional method in the industry has been to use a composition Bakelite rubber material or to use an interference fit with some other plastic or metal base slinger.

(3) Provide a resilient member which is in the washer/rotor package with a function of absorbing the 120 cycle vibrations that are fundamental in the rotor assembly. These vibrations result in a clatter noise that is commonly called "end bump". Various types of material have been used—from cloth, cork, felts, to synthetic polyester materials. The basic function is to dampen vibration.

(4) Provide a bearing type surface between the rotating parts of the rotor and the stationary part of the bearing thrust surface to withstand certain frictional and thrust loads. Usually the thrust washer is oiled directly off the bearing and is made out of either steel or some of the modern plastics such as nylon.

Two of the problems that are inherent in the arrangements above are as follows:

(a) Under certain conditions it is difficult to drive the thrust washer. When the thrust washer is running against a rough bearing or dry surface, it will sometimes cause the resilient washer to slip against the thrust washer which results in a non-lubricated, non-bearing type surface which will cause a premature bearing failure.

(b) The oil slinger is generally constructed from stamped or fabricated parts and has sharp corners so that the oil, as it travels up across the surfaces, is slung off the corners in the form of droplets. It is intended that the oil travel, by virtue of its kinetic energy, across the gap into the oil reservoir. A conventional oil slinger has sharp corners and develops a fine mist with small oil droplets.

Ideally, the drops should be as large as possible in that very fine drops tend to float around in the air currents surrounding the rotor assembly and are capable of escaping complementary out of the internal oil catcher cavity and be lost forever to the oiling system. In addition, the construction should withstand the high operating temperatures which may be as high as 100° C.

Among the objectives of the present invention are to provide end play and lubricating system which obviates the problems of the prior art and reduces the costs.

In accordance with the invention, the fractional horsepower electric motor comprises a stator, a shell supporting the stator, end members closing the ends of the shell, a shaft supporting a rotor within the stator, a bearing system on the end members rotatably supporting the shaft comprising a bearing member on the shaft engaging a seat on the end member, a spring means yieldingly urging the bearing member against the seat, an oil retention body associated with the bearing member, a spacer on the shaft, and a composite washer interposed between said spacer and said bearing member through which said shaft extends. The composite washer comprises a base layer of plastic filament material, a layer of elastic material bonded to one surface of the base layer, and an oil impregnated medium bonded to the other surface of the base layer and engaging said bearing member, whereby oil from the bearing passes through the base layer in capillary fashion and upon rotation is directed in small droplets toward said oil reservoir.

DESCRIPTION

Figure 1:
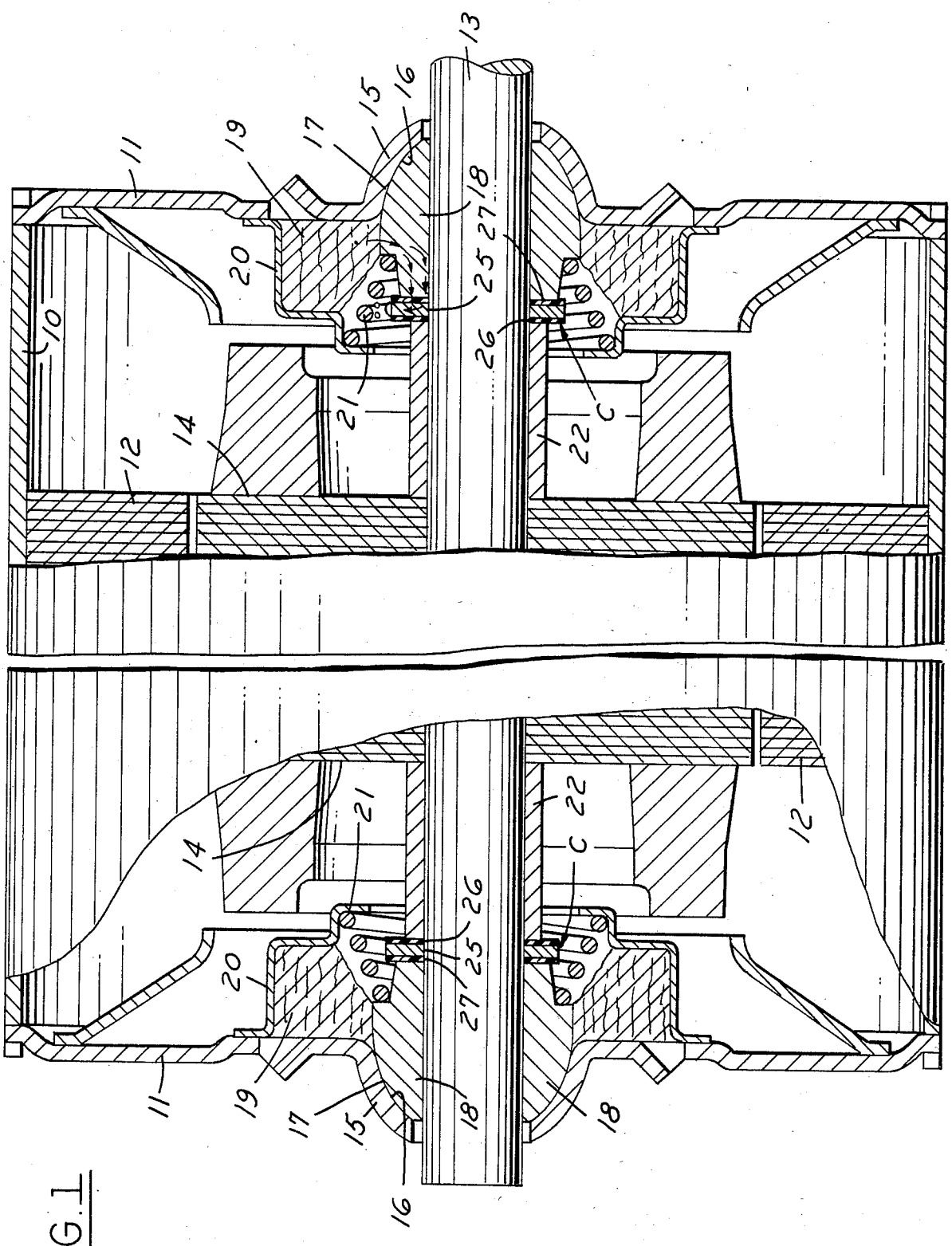
FIG. 1 is a fragmentary part sectional view of a fractional horsepower electric motor embodying the invention.

Referring to FIG. 1, the fractional horsepower electric motor embodying the invention comprises a cylindrical metal shell 10 and end members 11 fastened to the shell 10 in a manner as set forth in U.S. Pat. No. 3,567,973 which is incorporated herein by reference.

The shell 10 supports a stator 12 and the end members 11 rotatably support a shaft 13 on which a rotor 14 is mounted.

Each end member 11 includes a deformed portion 15 that defines a spherical seat 16 engaged by a complementary surface 17 of a bearing member 18 which is made of porous oil retaining material such as sintered metal. An oil reservoir 19 is defined by a body of felt held in position by an oil catcher 20 as shown in U.S. application Ser. No. 640,980 filed Aug. 15, 1984, titled "BEARING SYSTEM FOR FRACTIONAL HORSEPOWER ELECTRIC MOTORS", having a common assignee and incorporated herein by reference. A spring 21 yieldingly urges the bearing member against the seat.

In accordance with the invention, a tubular spacer 22 is provided on each end of the shaft 13 and a composite washer C is provided on shaft 13 and interposed between the tubular spacer 22 and the bearing member 18. Additional spacers or washers can be provided as required during assembly.

The composite washer C comprises a base layer 25 of capillary type material such as plastic filament, preferably spun bonded polyester filament. In a preferred embodiment, the filament has a diameter of approximately 0.0015 inch and the axial thickness of the layer is approximately 0.20–0.030 inch. The composite washer C further includes an outer resilient layer 26 on one side of the base layer 25 comprising a resilient elastic material such as Buna N rubber. The opposite surface of the base layer 25 has an oil impregnated layer or medium 27 bonded thereto which is porous and impregnated with lubricant and preferably comprises nylon impregnated with molybdenum disulfide, sold under the trademark "NYLATRON" by The elastic layer 26 preferably has a thickness of about 0.030 inch and the plastic layer 27 has a thickness of about 0.010 inch.

The outer diameter of each of the layers is equal and the inner diameter of the elastic layer 26 is preferably slightly greater than the inner diameter of the other layers 25, 27 so that the elastic layer 26 will form a seal with the shaft 13.

The composite washer C is placed on the shaft 13 with the plastic layer 27 adjacent the flat end of bearing member 18.

Figure 3:
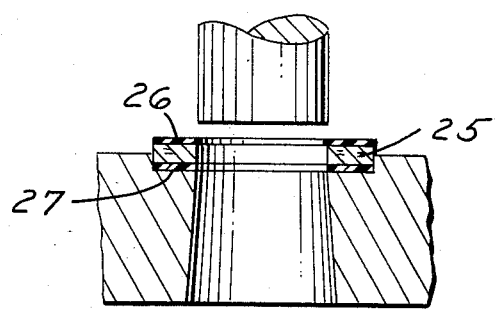
FIG. 3 is a partly diagrammatic view showing making one of the parts of the motor.

Referring to FIG. 3, the slightly smaller diameter of the elastic layer 26 is obtained by utilizing a punch P in the manufacture of the composite washer wherein the punch P upon movement to form the openings in the layers 25, 26, 27 deforms and carries with it part of the rubber layer 26 so that, as a result, the rubber layer 26 has a smaller diameter than the other layers 25, 27.

In use, the oil follows shown by the arrows and upon rotation of the shaft 13 large droplets of oil pass to the oil reservoir 19.

Figure 2:
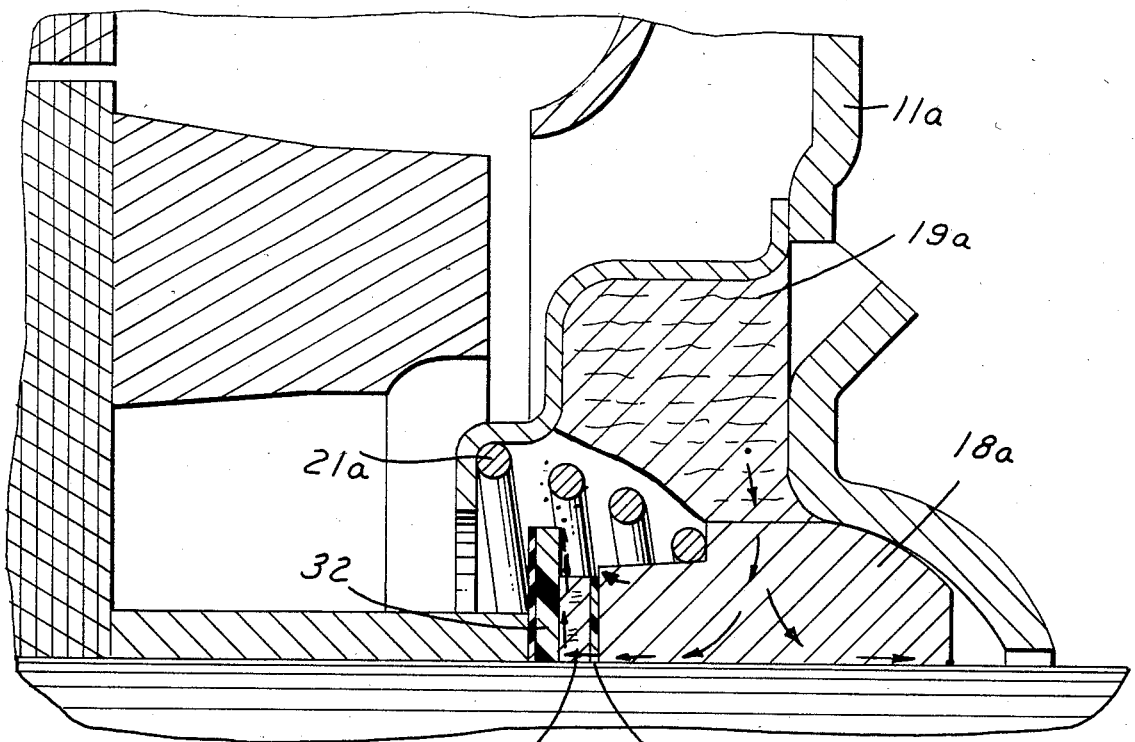
FIG. 2 is a fragmentary sectional view of a prior art motor.

This may be contrasted with the prior art arrangement shown in FIG. 2 wherein the end play is controlled by a plastic impregnated washer 30 adjacent the bearing member 13a, a separate felt washer 31 and a separate oil throw washer 32 of larger diameter. As shown by the arrows, the oil flows toward the sharp edge of the oil throw washer 32 and in small droplets or mist toward the oil reservoir 19a.

The advantage of the end play and lubricating system are as follows:

(1) The single composite washer C which has a seal layer 26 on the back side to seal on the shaft 13, a resilient layer 25 in the center, and a thrust or wearing layer 27 on the outside results in substantial cost savings in manufacture, assembly and inventory.

(2) The problem of relative motion between the resilient member and the thrust washer is eliminated by virtue of the bonding of the layers. As a result the entire washer C is spinning at the rotating speed of the rotor with no possibility of slippage taking place between the components.

(3) Prior art oil slingers are different to design in that it is virtually impossible to get a large drop of oil off of a sharp corner; thin parts (either stamped or molded) have some type of sharp corner. The matted polyester layer 25, surprisingly, forms an excellent slinger system in that it is able to provide two functions.

(a) It is a capillary device and is able to hold and store oil. When a motor is not in motion, it is able to absorb and hold any oil that drains down out of the bearing journal area.

(b) On the other hand, it is porous enough that centrifugal forces cause the oil to migrate to the outside perimeter and to be thrown across to the oil reservoir 18. Studies have indicated that it is possible to transfer a higher percentage of larger drops of oil with this system than in a conventional non-porous system.

I claim:

1. A fractional horsepower electric motor comprising a stator,
    a shell supporting the stator,
    end members closing the ends of the shell,
    a shaft supporting a rotor within the stator,
    a bearing system on the end members rotatably supporting the shaft comprising
    a bearing member on said shaft,
    said end member having a seat for engagement by said bearing member,
    spring means yieldingly urging said bearing member against said seat,
    oil retention means associated with the bearing member,
    a spacer on said shaft,
    and a composite washer interposed between said spacer and said bearing member having an opening through which said shaft extends through which said shaft extends,
    said composite washer comprising a base layer of plastic filament material having an opening through which said shaft extends,
    a layer of elastic material bonded to one surface of said base layer having an opening through which said shaft extends,
    and an oil impregnated layer bonded to the other surface of said base layer and engaging said bearing member having an opening through which said shaft extends, the outer diameter of the base layer being not less than the diameter of the elastic layer and the oil impregnated layer,
    the diameter of the opening through the oil impregnated layer being less than the diameters of the opening in said base layer and said elastic layer,
    whereby oil from said bearing passes through said base layer in capillary fashion and upon rotation is directed in small droplets toward said oil reservoir.

2. The electric motor set forth in claim 1 wherein the outer diameters of said layers are substantially the same.

3. The electric motor set forth in claim 1 wherein said base layer comprises polyester filaments.

4. The electric motor set forth in claim 1 wherein said base layer comprises spun bonded polyester filaments.

5. The electric motor set forth in claim 4 wherein said filaments have a diameter of about 0.0015 inch.

6. The electric motor set forth in claim 1 wherein said elastic layer comprises Buna N.

7. The electric motor set forth in claim 1 wherein said oil impregnated layer comprises plastic impregnated with molybdenum disulfide.

* * * * *